(12) United States Patent
Gao et al.

(10) Patent No.: US 12,510,762 B2
(45) Date of Patent: Dec. 30, 2025

(54) DISPLAY APPARATUS

(71) Applicant: BEIJING SHIYAN TECHNOLOGY CO., LTD., Beijing (CN)

(72) Inventors: Jian Gao, Beijing (CN); Sen Ma, Beijing (CN); Xue Dong, Beijing (CN); Tao Hong, Beijing (CN); Kuanjun Peng, Beijing (CN); Zhongyuan Wu, Beijing (CN)

(73) Assignee: BEIJING SHIYAN TECHNOLOGY CO., LTD., Beijing (CN)

( * ) Notice: Subject to any disclaimer, the term of this patent is extended or adjusted under 35 U.S.C. 154(b) by 467 days.

(21) Appl. No.: 18/026,754

(22) PCT Filed: May 20, 2022

(86) PCT No.: PCT/CN2022/094207
§ 371 (c)(1),
(2) Date: Mar. 16, 2023

(87) PCT Pub. No.: WO2023/221116
PCT Pub. Date: Nov. 23, 2023

(65) Prior Publication Data
US 2024/0288708 A1 Aug. 29, 2024

(51) Int. Cl.
*G02B 30/29* (2020.01)
*H04N 13/305* (2018.01)

(52) U.S. Cl.
CPC .......... *G02B 30/29* (2020.01); *H04N 13/305* (2018.05)

(58) Field of Classification Search
None
See application file for complete search history.

(56) References Cited

U.S. PATENT DOCUMENTS

| 2011/0001803 A1 | 1/2011 | De Zwart et al. |
| 2014/0285642 A1 | 9/2014 | Hwang et al. |

(Continued)

FOREIGN PATENT DOCUMENTS

| CN | 101895777 A | 11/2010 |
| CN | 103680325 A | 3/2014 |

(Continued)

OTHER PUBLICATIONS

Kim et al., "Crosstalk-Reduced Dual-Mode Mobile 3D Display", Journal of Display Technology, IEEE Service Center, New York, NY, US, vol. 11, No. 1, Jan. 1, 2015 (Jan. 1, 2015), pp. 97-103.

(Continued)

*Primary Examiner* — Robert E. Tallman
(74) *Attorney, Agent, or Firm* — ArentFox Schiff LLP; Michael Fainberg

(57) ABSTRACT

Provides is a display apparatus including: a display panel including: pixel islands in arrays in a row direction and a column direction, pixel islands include n sub-pixels at intervals in the row direction, n>1. The display panel has a preset horizontal direction and a preset vertical direction perpendicular to the preset horizontal direction; a light-splitting assembly at a display side of the display panel, the light-splitting assembly includes light-splitting repeating units extending in a first direction and continuously in the preset horizontal direction, light-splitting repeating units include M light-splitting structures extending in the first direction; a width of M light-splitting structures is equal to a width of K pixel islands in row direction, M and K are positive integers, an included angle between the first direction and the preset horizontal direction and an included angle between the first direction and the preset vertical direction are greater than 0.

20 Claims, 8 Drawing Sheets

(56) References Cited

U.S. PATENT DOCUMENTS

| | | |
|---|---|---|
| 2016/0018569 A1 | 1/2016 | Zheng |
| 2017/0017086 A1 | 1/2017 | Wei |
| 2017/0163975 A1 | 6/2017 | Jin et al. |
| 2017/0264891 A1 | 9/2017 | Iwasaki |

FOREIGN PATENT DOCUMENTS

| | | |
|---|---|---|
| CN | 104062762 A | 9/2014 |
| CN | 105372823 A | 3/2016 |
| CN | 104570370 B | 2/2017 |
| CN | 106896517 A | 6/2017 |
| CN | 107065204 A | 8/2017 |
| CN | 208092352 U | 11/2018 |
| JP | 2018120189 A | 8/2018 |

OTHER PUBLICATIONS

Ma et al., "Tilted LCD Pixel With Liquid Crystal GRIN Lens for Two-Dimensional/Three-Dimensional Switchable Display", IEEE Photonics Journal, IEEE, USA, vol. 11, No. 4, Aug. 1, 2019, pp. 1-9.
Extended European Search Report mailed on Oct. 31, 2024 in European Patent Application No. 22942155.7.

DISPLAY APPARATUS

CROSS-REFERENCE TO RELATED APPLICATIONS

This application is a National Stage of International Application No. PCT/CN2022/094207, filed May 20, 2022, which is hereby incorporated by reference in its entirety.

FIELD

The present disclosure relates to the technical field of display, and particularly relates to a display apparatus.

BACKGROUND

With the continuous development of a display technology, a three dimensional (3D) display technology has received increasing attention. A vivid stereoscopic display picture can be exhibited with the aid of the 3D display technology. Its principle is to receive a left eye image and a right eye image with some parallax through the left eye and the right eye respectively, and then superimpose and fuse image information through the brain, so as to create a 3D visual display effect. Since it's common practice to use both landscape and portrait orientations on mobile terminal products, an urgent demand for a bidirectional naked-eye 3D product with perfect compatibility between landscape and portrait orientations rises.

SUMMARY

An embodiment of the present disclosure provides a display apparatus, including: a display panel, where the display panel includes: a plurality of pixel islands arranged in arrays in a row direction and a column direction; each of the pixel islands includes n sub-pixels arranged at intervals in the row direction, where n is an integer greater than 1; and the display panel has a preset horizontal direction and a preset vertical direction perpendicular to the preset horizontal direction; and a light-splitting assembly at a display side of the display panel, where the light-splitting assembly includes a plurality of light-splitting repeating units extending in a first direction and continuously arranged in the preset horizontal direction; each light-splitting repeating unit includes M light-splitting structures extending in the first direction; in the row direction, a width of the M light-splitting structures is equal to a width of K pixel islands, where M and K are positive integers; and both an included angle between the first direction and the preset horizontal direction and an included angle between the first direction and the preset vertical direction are greater than 0.

In some embodiments, the row direction is parallel to the preset horizontal direction, and the column direction is parallel to the preset vertical direction.

In some embodiments, both an included angle between the row direction and the preset horizontal direction and an included angle between the row direction and the preset vertical direction are greater than 0, and both an included angle between the column direction and the preset horizontal direction and an included angle between the column direction and the preset vertical direction are greater than 0; and the first direction is parallel to the column direction.

In some embodiments, light rays emitted from light-emitting zones of all the sub-pixels in K pixel islands and split by M light-splitting structures form a continuous light-emitting zone in a space.

In some embodiments, M=K=1.

In some embodiments, M>K=1, and alternatively, K>M=1.

In some embodiments, M is unequal to K, both M and K are integers greater than 1, M and K are co-prime, and K*n and M are co-prime.

In some embodiments, the sub-pixels include sub-pixel aperture zones; and in the row direction, a ratio of a total width of n sub-pixel aperture zones to the width of the pixel island is greater than or equal to 0.9/M and smaller than or equal to 1.

In some embodiments, in the row direction, the light-emitting zones of all the sub-pixels in the K pixel islands are complementarily spliced in a space.

In some embodiments, in the row direction, a ratio of a width of the sub-pixel aperture zones to the width of the pixel island is 1/M.

In some embodiments, in the row direction, the light-emitting zones of all the sub-pixels in the K pixel islands overlap each other in a space.

In some embodiments, in the row direction, the light-emitting zones of all the sub-pixels in the K pixel islands evenly overlap each other in a space.

In some embodiments, in the row direction, a ratio of a width of the sub-pixel aperture zones to the width of the pixel island is i/M, where i is an integer greater than 1 and smaller than or equal to M−1.

In some embodiments, M=2, and K=3.

In some embodiments, the included angle between the first direction and the preset horizontal direction and the included angle between the first direction and the preset vertical direction are both 45°.

In some embodiments, the sub-pixels include the sub-pixel aperture zones, and each sub-pixel aperture zone is in a shape of a rectangle; and two pairs of sides of the rectangle are parallel to the row direction and the column direction respectively.

In some embodiments, the sub-pixels include the sub-pixel aperture zones, and each sub-pixel aperture zone is in a shape of a parallelogram; and one pair of sides of the parallelogram are parallel to the row direction, and the other pair of sides of the parallelogram are parallel to the first direction.

In some embodiments, the display panel includes: an array substrate including a plurality of scanning lines extending in the row direction and a plurality of data lines extending in the column direction; and an opposite substrate arranged opposite the array substrate and including a light-shielding layer, where the light-shielding layer includes a plurality of sub-pixel aperture zones.

In some embodiments, the display apparatus further includes: a spacer dielectric layer between the light-splitting assembly and the display panel.

In some embodiments, each light-splitting structure is a cylindrical lens.

In some embodiments, the cylindrical lens includes a first resin layer having a protrusion, and a planarized resin layer at one side of the first resin layer facing away from the display panel; and the planarized resin layer has a smaller refractive index than the first resin layer.

In some embodiments, the cylindrical lens is a liquid crystal lens.

In some embodiments, a radius of curvature of the cylindrical lens is greater than or equal to 0.9r and smaller than or equal to 1.24r, where $$r = \frac{(n1-n2)}{n3} \times \frac{n3L1}{W} \times \frac{KP1\cos\theta}{M},$$

n1 is a refractive index of the first resin layer or an extraordinary-light refractive index of the liquid crystal lens, n2 is a refractive index of the planarized resin layer or an ordinary-light refractive index of the liquid crystal lens, n3 is a refractive index of the spacer dielectric layer, L1 is an optimal viewing distance of the display apparatus, P1 is the width of the pixel island in the row direction, θ is an included angle between the first direction and the column direction, and W is a width of a projection of a main lobe viewing angle formed by light rays emitted from the sub-pixel at the optimal viewing distance.

In some embodiments, every three pixel islands continuously arranged in the column direction constitute one pixel repeating unit; and in one pixel repeating unit, the sub-pixels of the same pixel island display the same color, and the sub-pixels of different pixel islands display different colors.

BRIEF DESCRIPTION OF THE DRAWINGS

To describe technical solutions in embodiments of the present disclosure more clearly, the accompanying drawings required for describing the embodiments are briefly introduced below. Obviously, the accompanying drawings in the following description show merely some embodiments of the present disclosure, and those of ordinary skill in the art would also be able to derive other accompanying drawings from these accompanying drawings without creative efforts.

DETAILED DESCRIPTION OF THE EMBODIMENTS

Figure 1:
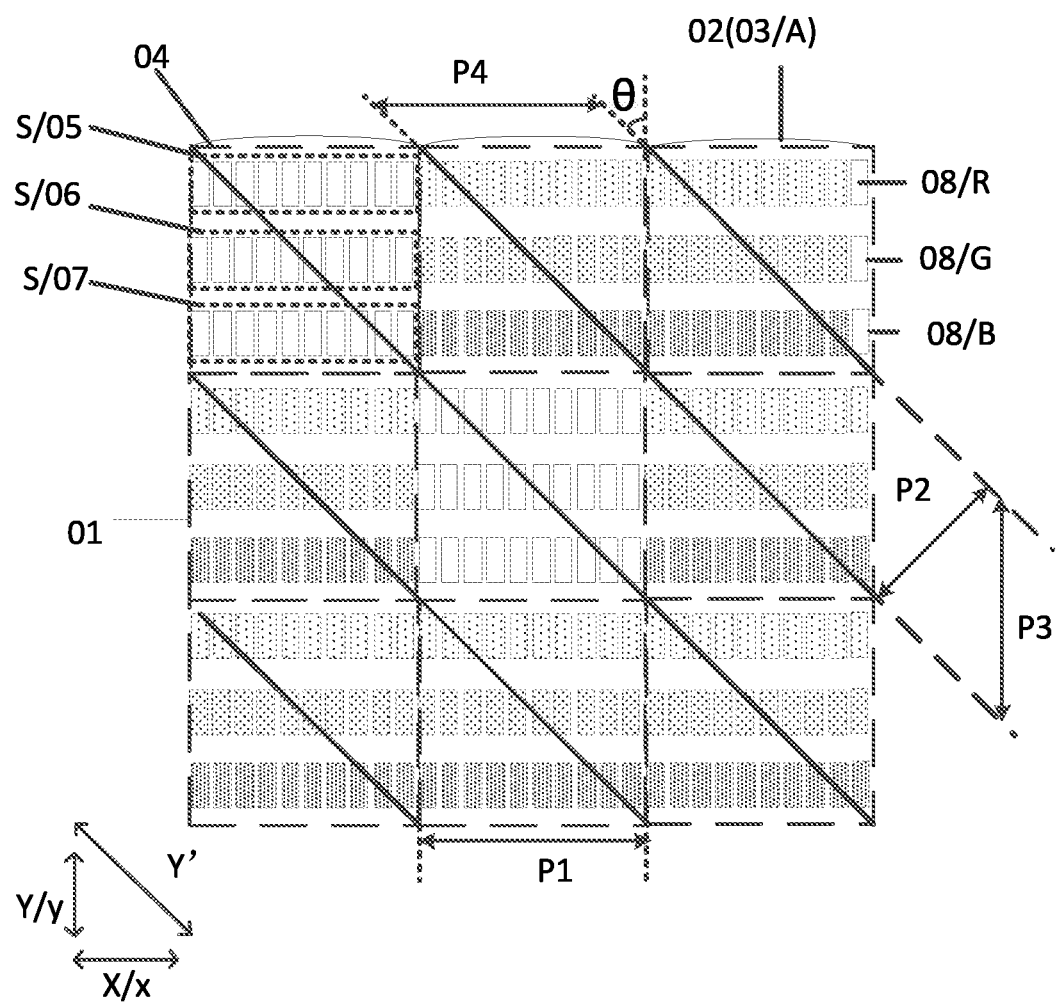
FIG. 1 is a schematic structural diagram of a display apparatus according to an embodiment of the present disclosure.

For making objectives, technical solutions and advantages of embodiments of the present disclosure clearer, the technical solutions of the embodiments of the present disclosure will be clearly and completely described below in conjunction with the accompanying drawings in the embodiments of the present disclosure. Apparently, the embodiments described are some rather than all of the embodiments of the present disclosure. The embodiments in the present disclosure and features of the embodiments can be combined with each other without conflict. Based on the embodiments of the present disclosure, all other embodiments obtained by those of ordinary skill in the art without making creative efforts fall within the scope of protection of the present disclosure.

Unless otherwise defined, technical or scientific terms used in the present disclosure should have ordinary meanings as understood by those of ordinary skill in the art to which the present disclosure belongs. "First", "second", and other similar words used in the present disclosure do not indicate any order, amount or importance, but are only used to distinguish different components. "Include", "comprise", and other similar words indicate that elements or objects before the word include elements or objects after the word and their equivalents, without excluding other elements or objects. "Connection", "connected", and other similar words are not limited to physical or mechanical connections, but can include electrical connections, which can be direct or indirect.

It should be noted that a size and a shape of each figure in the drawings do not reflect a true scale, but only for illustrating the present disclosure. Throughout the drawings, identical or similar reference numerals denote identical or similar elements or elements having identical or similar functions.

Figure 5:
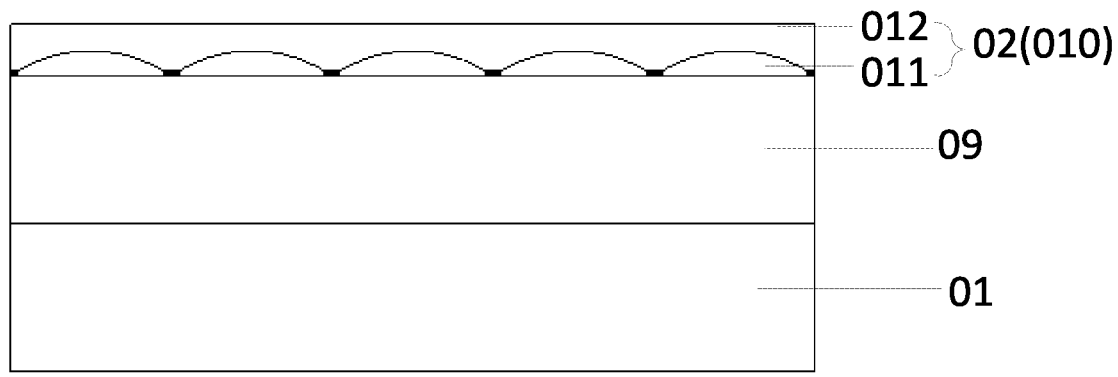
FIG. 5 is a schematic structural diagram of another display apparatus according to an embodiment of the present disclosure.

An embodiment of the present disclosure provides a display apparatus. As shown in FIGS. 1 and 5, the display apparatus includes:

a display panel 01, where the display panel 01 includes: a plurality of pixel islands S arranged in arrays in a row direction x and a column direction y; each of the pixel islands S includes n sub-pixels 08 arranged at intervals in the row direction x, where n is an integer greater than 1; the display panel has a preset horizontal direction X and a preset vertical direction Y perpendicular to the preset horizontal direction X; and in FIG. 1, the row direction x is perpendicular to the column direction y; and a light-splitting assembly 02 at a display side of the display panel 01, where the light-splitting assembly 02 includes a plurality of light-splitting repeating units 03 extending in a first direction Y' and continuously arranged in the preset horizontal direction X; each light-splitting repeating unit 03 includes M light-splitting structures A extending in the first direction Y'; in the row direction x, a width of the M light-splitting structures A is equal to a width of K pixel islands S, where M and K are positive integers; and both an included angle between the first direction Y' and the preset horizontal direction X and an included angle between the first direction Y' and the preset vertical direction Y are greater than 0.

Figure 2:
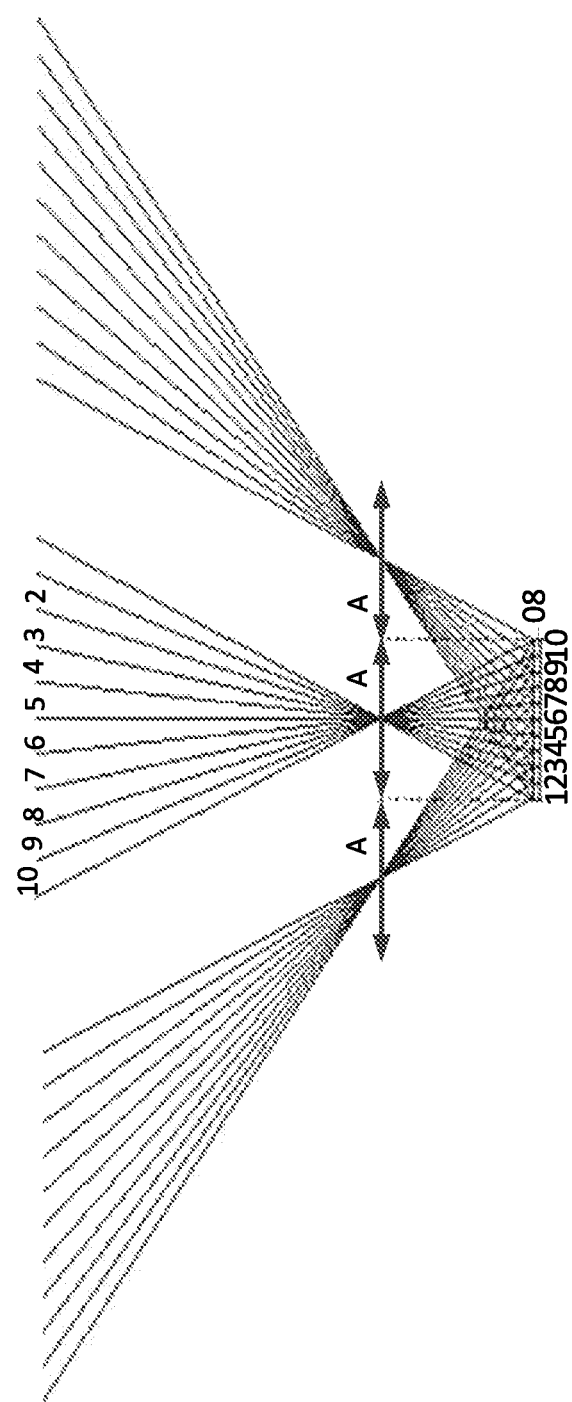
FIG. 2 is a schematic of a view formed in a space after light emitted from a sub-pixel is split by a light-splitting structure directly above the sub-pixel according to an embodiment of the present disclosure.
Figure 3:
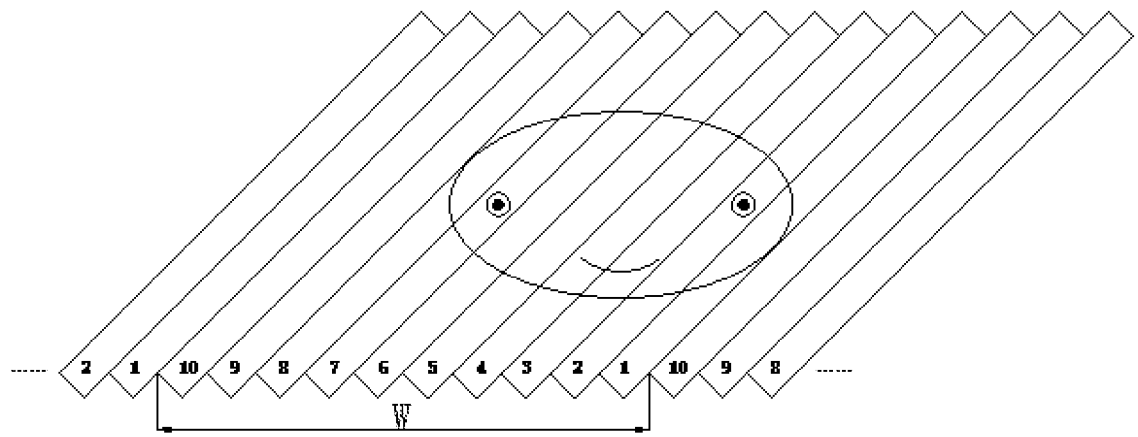
FIG. 3 is a schematic diagram of a view received by human eyes when a connection line between the human eyes is parallel to the preset horizontal direction.
Figure 4:
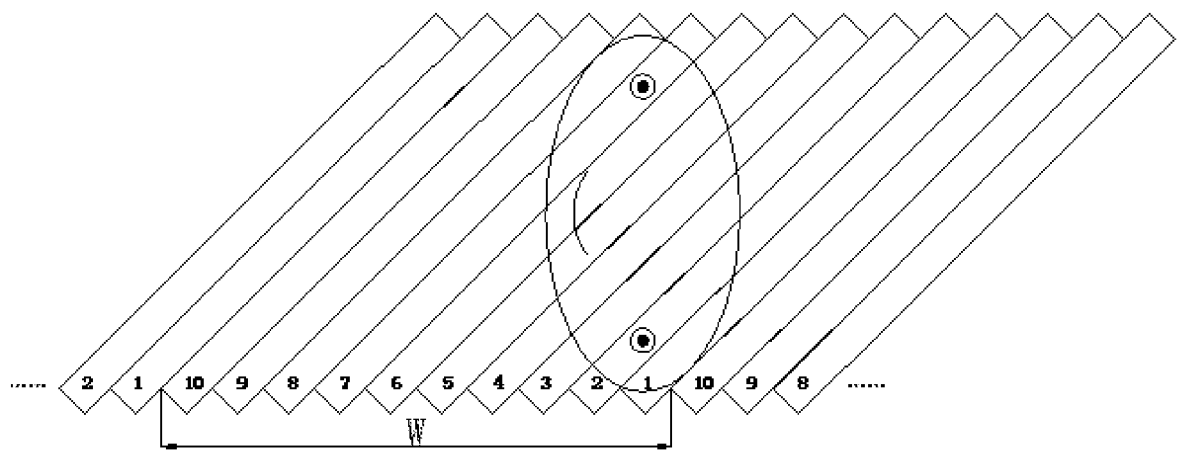
FIG. 4 is a schematic diagram of a view received by human eyes when a connection line between the human eyes is parallel to the preset vertical direction.

It should be noted that in the row direction x, the width of the M light-splitting structures is equal to the width of K pixel islands, which means that K pixel islands correspond to the M light-splitting structures in the row direction x. For example, in FIG. 1, each pixel island includes 10 sub-pixels, and one light-splitting structure corresponds to 10 sub-pixels. Schematic diagrams of views formed in a space after light emitted from a sub-pixel is split by a light-splitting structure directly above the sub-pixel and a view received by human eyes are shown in FIGS. 2, 3 and 4. A serial number of each zone represents a corresponding viewpoint. FIG. 3 is a schematic diagram of a view received by human eyes when a connection line between the human eyes is parallel to the preset horizontal direction, and FIG. 4 is a schematic diagram of a view received by human eyes when a connection line between the human eyes is parallel to the preset vertical direction. It may be seen from FIGS. 3 and 4 that the human eyes may see a parallax image in both the preset horizontal direction and the preset vertical direction.

According to the display apparatus according to some embodiments of the present disclosure, both an included angle between an extension direction of the light-splitting structures and the preset horizontal direction X and an included angle between the extension direction of the light-splitting structures and the preset vertical direction Y are greater than 0, that is, the light-splitting structures are obliquely placed relative to the preset horizontal direction X and the preset vertical direction Y, such that the human eyes may see the parallax image in both the preset horizontal direction and the preset vertical direction, and further the display apparatus may achieve bidirectional three dimensional (3D) display and improve user experience.

It should be noted that the "space" in the "in a space after light emitted from a sub-pixel is split by a light-splitting structure directly above the sub-pixel" refers to a visible space of the display apparatus.

In some embodiments, light rays emitted from light-emitting zones of all the sub-pixels in K pixel islands and split by M light-splitting structures form a continuous light-emitting zone in a space. The light-splitting structures have small sizes in the row direction, and for K×n sub-pixels corresponding to M light-splitting structures, the human eyes cannot determine which light-splitting structure a light ray is emitted from, so the human eyes see that light rays emitted from K×n sub-pixels and split by the M light-splitting structures above the sub-pixels form a continuous light-emitting zone in a space, and the human eyes cannot see a "black zone" when moving in the visible space. It should be noted that viewing angles include a main lobe viewing angle and a side lobe viewing angle. The main lobe viewing angle refers to a viewing angle formed in a space after light emitted from a sub-pixel is split by a light-splitting structure directly above the sub-pixel. The side lobe viewing angle refers to a viewing angle formed in a space after a light ray emitted from a sub-pixel passes a light-splitting structure near the light-splitting structure directly above the sub-pixel. For example, a primary side lobe viewing angle is formed after light passes a first light-splitting structure adjacent to the light-splitting structure directly above, a secondary side lobe viewing angle is formed after light passes a second light-splitting structure adjacent to the light-splitting structure directly above, and so on.

It should be noted that the preset horizontal direction X and the preset vertical direction Y of the display panel are also a preset horizontal direction X and a preset vertical direction Y of the display apparatus. Specific directions of the preset horizontal direction X and the preset vertical direction Y may be set according to use and appearance of the display apparatus. For example, when the display panel and the display apparatus are in shapes of rectangles and each rectangle has a pair of long sides and a pair of short sides, a direction parallel to the long sides may be the preset horizontal direction while a direction parallel to the short sides may be the preset vertical direction, and alternatively, a direction parallel to the long sides may be the preset vertical direction while a direction parallel to the short sides may be the preset horizontal direction. For example, for a display apparatus like a mobile phone, a direction parallel to short sides may be set as the preset horizontal direction, and for a display apparatus like a tablet computer, a direction parallel to long sides may be set as the preset horizontal direction.

It should be noted that the display apparatus provided in the embodiment of the present disclosure may be used for 3D display, and may further switch between 3D and two dimensional (2D) display. A pixel island may be used as a fractional-pixel of 2D display. One pixel island includes a plurality of sub-pixels, such that 3D display may maintain the same resolution as 2D display. An eye-tracking system is combined, multi-view display with a large viewing angle may be achieved, and 3D display with more pixels per inch (ppi) may be further achieved, with more information and lower color crosstalk between adjacent viewpoints.

In some embodiments, the light-splitting structures are configured to control light-emitting angles of all the sub-pixels, so as to achieve directional light emission.

In some embodiments, the display panel may be one of a liquid crystal display (LCD) panel, an organic light-emitting diode (OLED) display panel, a quantum dot light-emitting diode (QLED), a micro inorganic light-emitting diode (micro LED) display panel, and a mini LED display panel.

In some embodiments, as shown in FIG. 1, every three pixel islands S continuously arranged in the column direction y constitute one pixel repeating unit 04; and
  in one pixel repeating unit 04, the sub-pixels 08 of the same pixel island S display the same color, and the sub-pixels 08 of different pixel islands S display different colors.

In some embodiments, as shown in FIG. 1, one pixel repeating unit 04 includes: a first pixel island 05, a second pixel island 06, and a third pixel island 07. The first pixel island 05 includes a plurality of red sub-pixels R, the second pixel island 06 includes a plurality of green sub-pixels G, and the third pixel island 07 includes a plurality of blue sub-pixels B.

In some embodiments, as shown in FIG. 1, all the sub-pixels 08 in one row of pixel islands S display the same color.

In some embodiments, as shown in FIG. 5, the display apparatus further includes:
  a spacer dielectric layer 09 between the light-splitting assembly 02 and the display panel 01.

In some embodiments, each light-splitting structure is a cylindrical lens.

In some embodiments, as shown in FIG. 5, the cylindrical lens 010 includes a first resin layer 011 having a protrusion, and a planarized resin layer 012 at one side of the first resin layer 011 facing away from the display panel 01; and the planarized resin layer 012 has a smaller refractive index than the first resin layer 011.

Alternatively, in some embodiments, the cylindrical lens is a liquid crystal lens. When the cylindrical lens is a zoom liquid crystal lens, the cylindrical lens may have different radii of curvature at different viewing angles, such that crosstalk between adjacent viewpoints may be relatively small without obvious change with fluctuation of radii of curvature, and a viewing range of zero crosstalk between left and right eyes may be large.

Certainly, during specific implementation, the light-splitting structure may also be a geometric lens, a diffraction lens, a liquid lens, or another structural apparatus capable of controlling a light-emitting direction of a sub-pixel.

In some embodiments, a placement height of the light-splitting structure, that is, a thickness H of the spacer dielectric layer, satisfies the following condition:

$$H = \frac{n3L1}{W} \times P2.$$

L1 is an optimal viewing distance of the display apparatus; W is a width of a projection of a main lobe viewing angle formed by light rays emitted from a sub-pixel at the optimal viewing distance, that is, W is a total width of viewpoints at the optimal viewing distance without repeated viewpoints; n3 is a refractive index of the spacer dielectric layer; and P2 is a width of the cylindrical lens in a direction perpendicular to the first direction.

Optionally, $$P2 = \frac{KP1 \cos \theta}{M};$$

and P1 is a width of a pixel island in the row direction, and θ is an included anole between the first direction and the column direction. That is, $$H = \frac{n3L1}{W} \times P2 = \frac{n3L1}{W} \times \frac{KP1 \cos \theta}{M}.$$

In some embodiments, a radius of curvature of the cylindrical lens is greater than or equal to 0.9r and smaller than or equal to 1.24r, where $$r = \frac{(n1 - n2)}{n3} \times \frac{n3L1}{W} \times \frac{KP1 \cos \theta}{M},$$

n1 is a refractive index of the first resin layer or an extraordinary-light refractive index of the liquid crystal lens, n2 is a refractive index of the planarized resin layer or an ordinary-light refractive index of the liquid crystal lens, n3 is a refractive index of the spacer dielectric layer, L1 is an optimal viewing distance of the display apparatus, and W is a width of a projection of a main lobe viewing angle formed by light rays emitted from the sub-pixel at the optimal viewing distance.

It should be noted that $$r = \frac{(n1 - n2)}{n3} \times \frac{n3L1}{W} \times \frac{KP1 \cos \theta}{M}$$

is an ideal value of a radius of curvature of the cylindrical lens obtained according to a design of an ideal lens focal plane design, in which a pixel light-emitting surface is located on a focal plane of the lens. During specific implementation, the radius of curvature of the cylindrical lens may be adjusted on the basis of the ideal value of the radius of curvature according to actual needs.

In some embodiments, as shown in FIG. 1, the included angle between the first direction Y' and the preset horizontal direction X and the included angle between the first direction and the preset vertical direction Y are both 45°. In FIG. 1, the preset vertical direction Y is parallel to the column direction y, that is, θ=45°.

In this way, as shown in FIGS. 3 and 4, the display apparatus provided in the embodiment of the present disclosure may not only enable human eyes to see the parallax image both in the preset horizontal direction and the preset vertical direction, but also achieve the same parallax of left and right eyes both in the preset horizontal direction and the preset vertical direction. Further, the same display effect seen by users in both the preset horizontal direction and the preset vertical direction may be achieved. Moreover, when it is necessary to conduct 3D time-limited layout by comparing boundary data of light-emitting angular spectra of sub-pixels and included angles between a center of eyes of a user and centers of all pixel island groups, the light-emitting angular spectra of the sub-pixels are the same in the preset horizontal direction and the preset vertical direction relative to light-splitting structures, such that layout difficulty may be reduced. For example, in FIGS. 3 and 4, parallax of left and right eyes is 5 in the preset horizontal direction and the preset vertical direction.

In some embodiments, as shown in FIG. 1, the row direction x is parallel to the preset horizontal direction X, and the column direction y is parallel to the preset vertical direction Y.

In some embodiments, when the row direction x is parallel to the preset horizontal direction X, the column direction y is parallel to the preset vertical direction Y, the included angle between the first direction Y' and the preset horizontal direction X and the included angle between the first direction and the preset vertical direction Y are both 45°, and a width of M light-splitting structures A is equal to a width of K pixel islands S in columns. In some embodiments, a width of a pixel island in the row direction is equal to the width of the pixel island in the column direction. As shown in FIG. 1, both the width of the pixel island in the row direction and the width of the pixel island in the column direction are both P1. Accordingly, a width of a light-splitting structure in the row direction is equal to a width of the light-splitting structure in the column direction.

In some embodiments, M=K=1. That is, in the row direction x, a width P4 of one light-splitting structure is equal to a width P1 of one pixel island, and in the column direction y, a width P3 of one light-splitting structure is equal to a width P1 of one pixel island.

Accordingly, P2=P1 cos 45°, and $$H = \frac{n3L1}{W} \times P1 \cos 45°.$$

It should be noted that in FIG. 1, M=K=1 is taken as an example for description. During specific implementation, M may also be set to be unequal to K. Specifically, M>K=1 may be set, and alternatively, K>M=1 may be set. Alternatively, M and K may be set to be co-prime, and K*n and M may be set to be co-prime.

Then, with the light-splitting structure as a cylindrical lens, K=1, M=1 and n=10 as examples, parameter designs of the light-splitting structure in the display apparatus provided in the embodiment of the present disclosure are introduced. During specific implementation, for example, the display apparatus includes 1080×1920 pixel islands, P1=116.4 µm, and P2=82.307 µm.

It should be noted that since the total number of pixel islands included in the display apparatus is resolution of 2D display, 2D display with retina-level resolution should be achieved for sizes of the pixel islands of the display apparatus provided in the embodiment of the present disclosure, that is, included angles between the pixel islands and human eyes are 1', such that L1=400 mm. In order to ensure no crosstalk between left and right eyes of 3D display at the optimal viewing distance, it is necessary to maximize the number of viewpoint intervals between the left and right eyes at the optimal viewing distance, such that the sum of widths of viewpoints without repeated viewpoints at the optimal viewing distance and a pupil distance D satisfy $$D = \left(\frac{1}{2} + m\right)W,$$

where m is an integer greater than or equal to 0. According to the condition, it may be seen that with increase in m, a viewpoint density may gradually increase, but a moving range of the human eyes may gradually decrease. In the embodiment of the present disclosure, a large moving range of human eyes is preferable, such that m=0, the pupil distance D of people is usually 65 mm, that is, W=2*D=130 mm. The spacer dielectric layer is generally made of glass, and n3=1.5. L1=400 mm, W=130 mm, n3=1.5 and P1=145.44 µm are substituted into $$H = \frac{n3L1}{W} \times P1 \cos 45°,$$

and H=537 mm is obtained.

During specific implementation, if n1=1.55, n2=1.42, and n3=1.5, H=537 mm, and $$r = \frac{(n1 - n2)H}{n3} = 46.56 \ \mu m.$$

Figure 6:
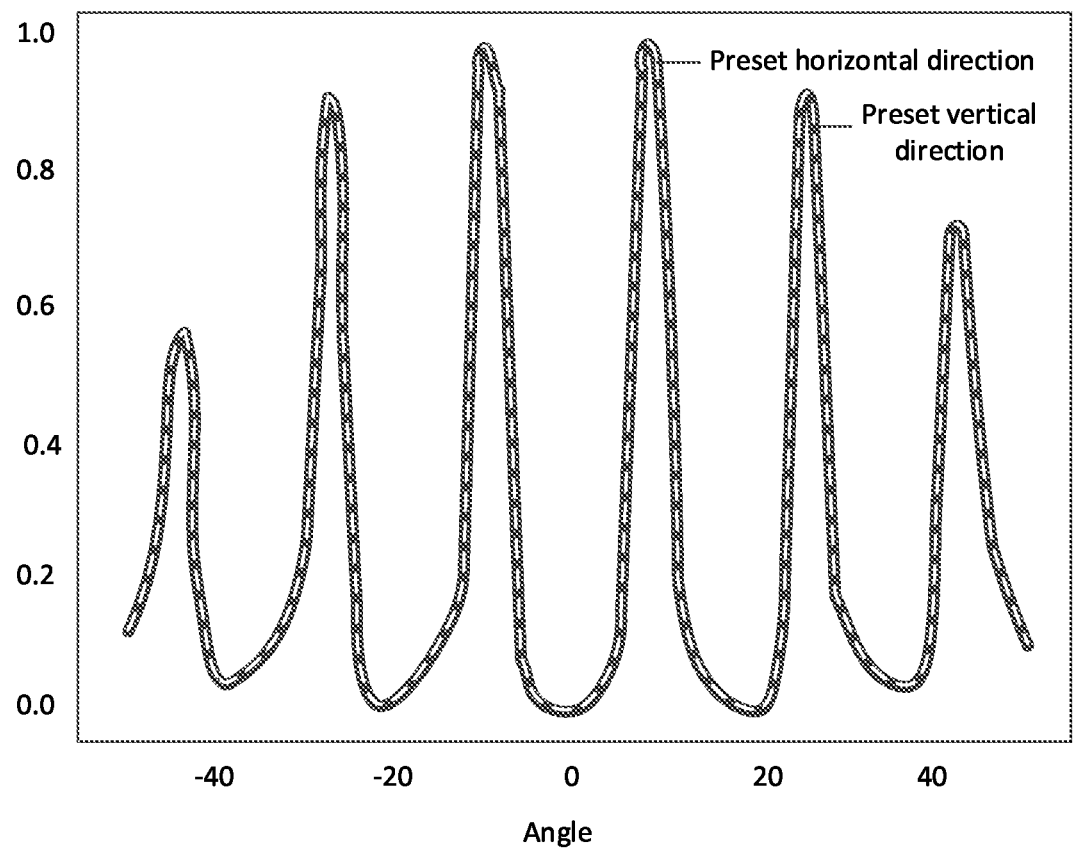
FIG. 6 is an angular spectrogram of light emission of sub-pixels of a display apparatus according to an embodiment of the present disclosure.
Figure 7:
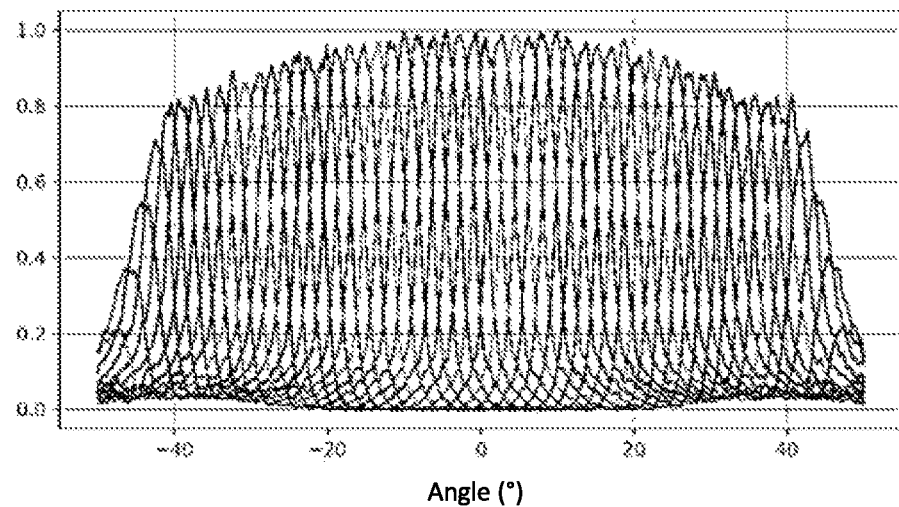
FIG. 7 is a distribution diagram of an angular spectrum of a sub-pixel in a horizontal direction according to an embodiment of the present disclosure.

Then, a simulation result of a radius of curvature of the cylindrical lens under the condition that the radius of curvature of the cylindrical lens is greater than or equal to 0.9r and smaller than or equal to 1.24r is introduced. According to the above computed parameters: P2=82.307 µm, H=537 mm, and r=46.56 µm, modeling is conducted, and then the radius of curvature is scanned, where the radius of curvature is 58 µm, such that a light-emitting angular spectrum of the sub-pixel numbered 6 under the condition of the radius of curvature of 58 µm as shown in FIG. 6 is obtained. It may be seen from FIG. 6 that angular spectra of the preset horizontal direction and the preset vertical direction are completely coincident, such that a technical effect of 3D compatibility in horizontal and vertical directions may be achieved. FIG. 7 shows distribution of angular spectra of 10 sub-pixels in a horizontal direction, from which crosstalk conditions between all viewpoints may be computed. Primary crosstalk (crosstalk between adjacent viewpoints) is 46.07%-58.62%, secondary crosstalk (crosstalk between spaced viewpoints) is 0.28%-2.78%, and there is no crosstalk after tertiary crosstalk. At the optimal viewing distance (L1=400 mm), crosstalk between left and right eyes is level 5, and crosstalk between the left and right eyes is 0, such that a desirable 3D display effect is achieved. Simulation is conducted according to distribution of crosstalk between left and right eyes corresponding to the above parameters in the whole visible space, and according to a crosstalk standard within 10%, the 3D visible space is 400 mm-600 mm in the preset vertical direction and −7.8°-7.8° in the preset horizontal direction.

Figure 8:
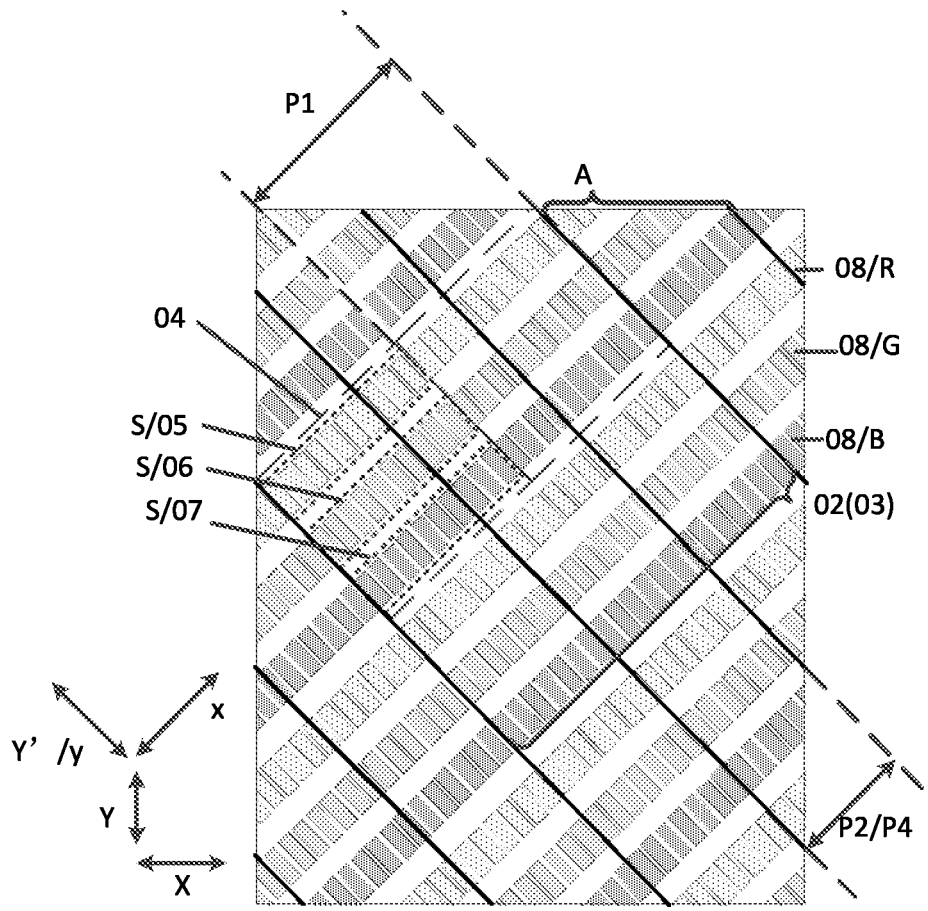
FIG. 8 is a schematic structural diagram of another display apparatus according to an embodiment of the present disclosure.

Alternatively, in some embodiments, as shown in FIG. 8, both an included angle between the row direction x and the preset horizontal direction X and an included angle between the row direction x and the preset vertical direction Y are greater than 0, and both an included angle between the column direction y and the preset horizontal direction X and an included angle between the column direction y and the preset vertical direction Y are greater than 0; and the first direction Y' is parallel to the column direction y.

Figure 9:
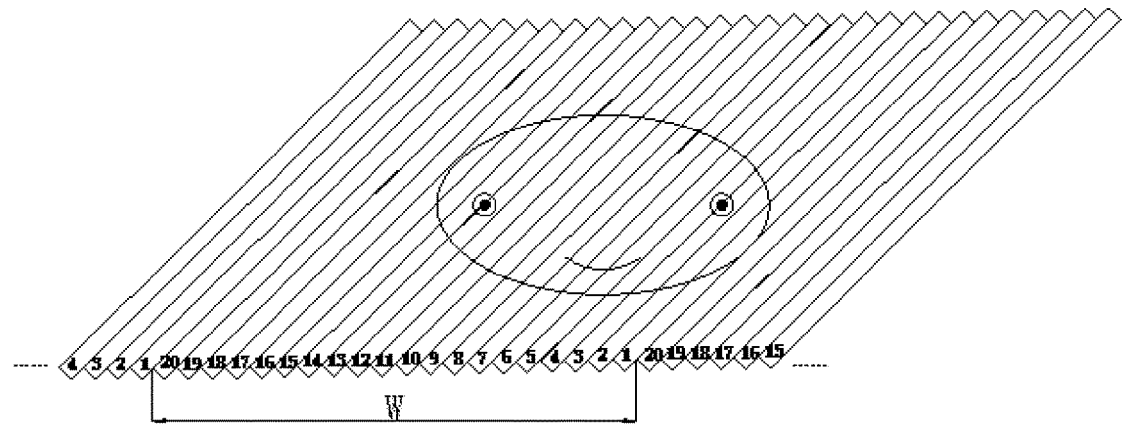
FIG. 9 is a schematic diagram of a view received by human eyes when a connection line between the human eyes is parallel to the preset horizontal direction.
Figure 10:
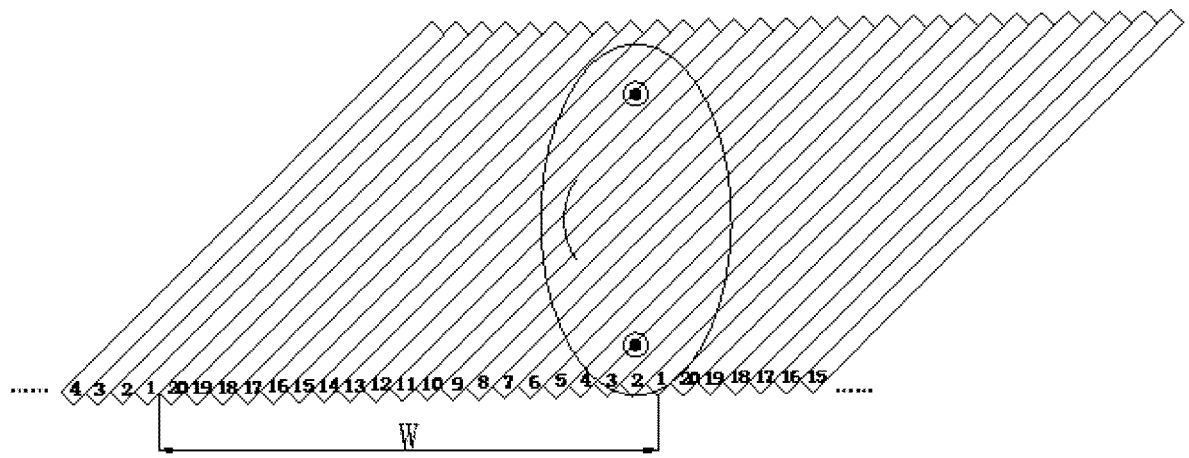
FIG. 10 is a schematic diagram of a view received by human eyes when a connection line between the human eyes is parallel to the preset vertical direction.

That is, an extension direction of one column of pixel islands and an extension direction of the cylindrical lens are oblique relative to the preset horizontal direction and the preset vertical direction. In the display apparatus shown in FIG. 8, schematic diagrams of views formed in a space after light emitted from a sub-pixel is split by a light-splitting structure directly above the sub-pixel and a view received by human eyes are shown in FIGS. 9 and 10. A serial number of each zone represents a corresponding viewpoint. FIG. 9 is a schematic diagram of a view received by human eyes when a connection line between the human eyes is parallel to the preset horizontal direction, and FIG. 10 is a schematic diagram of a view received by human eyes when a connection line between the human eyes is parallel to the preset vertical direction. That is, when an extension direction of one column of pixel islands and an extension direction of the cylindrical lens are oblique relative to the preset horizontal direction and the preset vertical direction, the human eyes may also see the parallax image in both the preset horizontal direction and the preset vertical direction, such that the display apparatus may achieve bidirectional 3D display.

In some embodiments, M=K=1 may be set. Alternatively, M may be set to be unequal to K. Specifically, M>K=1 may be set, and alternatively, K>M=1 may be set. Alternatively, as shown in FIG. 8, M and K may be set to be integers greater than 1, M and K may be set to be co-prime, and K*n and M may be set to be co-prime.

In some embodiments, as shown in FIGS. 8, K=2, M=3, and n=10. Since the first direction Y' is parallel to the column direction y, an included angle θ between the first direction Y' and the column direction y is equal to 0°. Accordingly, $$P2 = \frac{2P1}{3}, \text{ and } H\frac{-n3L1}{W} \times P2 = \frac{n3L1}{W} \times \frac{2P1}{3}.$$

Certainly, during specific implementation, K, M and n may also be set as other values.

In the display apparatus provided in some embodiments of the present disclosure, when both M and K are integers greater than 1, that is, pixel islands and light-splitting structures are in many-to-many correspondence, Sizes of the light-splitting structures in the row direction may be prevented from being too small, difficulty of manufacturing the light-splitting assembly may be prevented from being increased, the situation that a light-emitting divergence angle of a sub-pixel is increased due to diffraction of a light-splitting structure too small in size may be further avoided, crosstalk between views increases, and further a display effect is influenced.

When both M and K are integers greater than 1, M and K are co-prime, and K*n and M are co-prime, in some embodiments, the sub-pixels include sub-pixel aperture zones; and in the row direction x, a ratio of a total width of n sub-pixel aperture zones to the width of the pixel island is greater than or equal to 0.9/M and smaller than or equal to 1. That is, an aperture ratio of sub-pixels in the pixel island is greater than or equal to 0.9/M and smaller than or equal to 1.

When both M and K are integers greater than 1, M and K are co-prime, and K*n and M are co-prime, in some embodiments, in the row direction x, a ratio of a width of the sub-pixel aperture zones to the width of the pixel island is 1/M. That is, an aperture ratio of sub-pixels in the pixel island is 1/M. In this way, all the sub-pixels below each light-splitting repeating unit may be arranged in a staggered and complementary manner relative to the corresponding light-splitting structures, such that light-emitting zones of all the sub-pixels in the K pixel islands in the row direction x are complementarily spliced in a space, that is, light paths of all the viewpoints are closely connected, Moire patterns may be eliminated, and a display effect may be improved.

Alternatively, during specific implementation, in the row direction x, a ratio of the width of the sub-pixel aperture zones to the width of the pixel island may be greater than 1/M. Accordingly, in some embodiments, in the row direction x, the light-emitting zones of all the sub-pixels in the K pixel islands overlap each other in a space.

When the ratio of the width of the sub-pixel aperture zones to the width of the pixel island may be greater than 1/M in the row direction x, in some embodiments, in the row direction x, the light-emitting zones of all the sub-pixels in the K pixel islands evenly overlap each other in a space.

In some embodiments, in the row direction x, the ratio of the width of the sub-pixel aperture zones to the width of the pixel island is i/M, where i is an integer greater than 1 and smaller than or equal to M−1. That is, an aperture ratio of sub-pixels in the pixel island is i/M. In this way, all the sub-pixels below each light-splitting repeating unit may be arranged in a staggered, even and overlapped manner relative to the corresponding light-splitting structures, such that light-emitting zones of all the sub-pixels in the K pixel islands evenly overlap each other, that is, light paths of all the viewpoints evenly overlap each other, and similarly, Moire patterns may be eliminated, and a display effect may be improved.

It should be noted that when an aperture ratio of the sub-pixels in the pixel island is i/M and i is an integer greater than 1 and smaller than or equal to M−1, compared with the condition that the pixel island corresponds to the light-splitting structures, the aperture ratio of the sub-pixels may be further improved under the same number of light-splitting structures.

It should be noted that for example, in FIG. 8, a ratio of a width of opening zones of sub-pixels 08 to a width of a pixel island S in the row direction x is ⅔, that is, in the row direction, a ratio of a total width of n sub-pixel aperture zones to the width of the pixel island is (M−1)/M. That is, in FIG. 8, an aperture ratio of sub-pixels in the pixel island is ⅔. When an aperture ratio of the sub-pixels in the pixel island is (M−1)/M, the aperture ratio of the sub-pixels may be improved to the maximum extent under the condition that the light-emitting zones of all the sub-pixels in K pixel islands evenly overlap each other in a space in the row direction.

In some embodiments, when the light-emitting zones of all the sub-pixels in K pixel islands evenly overlap each other in a space, a ratio of an area of an overlapping zone of light-emitting zones of two sub-pixels having adjacent serial numbers to an area of a light-emitting zone of one of the sub-pixels is (i−1)/i. A ratio of an area of an overlapping zone of light-emitting zones of two sub-pixels having adjacent serial numbers to an area of one of the sub-pixels is (i−1)/M.

It should be noted that when a ratio of a total width of n sub-pixel aperture zones to the width of the pixel island is 1/M in the row direction, that is, i=1, light-emitting zones of all the sub-pixels do not overlap each other in a space. When i=2, a ratio of an area of an overlapping zone of light-emitting zones of two sub-pixels having adjacent serial numbers to an area of a light-emitting zone of one of the sub-pixels is ½, and a ratio of an area of an overlapping zone of light-emitting zones of two sub-pixels having adjacent serial numbers to an area of one of the sub-pixels is 1/M; when i=3, a ratio of an area of an overlapping zone of light-emitting zones of two sub-pixels having adjacent serial numbers to an area of a light-emitting zone of one of the sub-pixels is ⅔, and a ratio of an area of an overlapping zone of light-emitting zones of two sub-pixels having adjacent serial numbers to an area of one of the sub-pixels is 2/M; when i=4, a ratio of an area of an overlapping zone of light-emitting zones of two sub-pixels having adjacent serial numbers to an area of a light-emitting zone of one of the sub-pixels is ¾, and a ratio of an area of an overlapping zone of light-emitting zones of two sub-pixels having adjacent serial numbers to an area of one of the sub-pixels is 3/M; when i=M−1, a ratio of an area of an overlapping zone of light-emitting zones of two sub-pixels having adjacent serial numbers to an area of a light-emitting zone of one of the sub-pixels is (M−2)/(M−1), and a ratio of an area of an overlapping zone of light-emitting zones of two sub-pixels having adjacent serial numbers to an area of one of the sub-pixels is (M−2)/M; and so on.

Then, with the light-splitting structure as a cylindrical lens, K=2, M=3 and n=10 as examples, parameter designs of the light-splitting structure in the display apparatus provided in the embodiment of the present disclosure are introduced. During specific implementation, for example, the display apparatus includes 1080× 1920 pixel islands, P1=116.4 μm, P2=77.6 μm, and L1=400 mm. According to $$D = \left(\frac{1}{2} + m\right)W,$$

m=0, and when D=65 mm, W=2*D=130 mm. The spacer dielectric layer is generally made of glass, and n3=1.5. L1=400 mm, W=130 mm, n3=1.5 and P2=77.6 μm are substituted into $$H = \frac{n3L1}{W} \times P2,$$

and H=507 mm is obtained.

During specific implementation, if n1=1.55, n2=1.42, and n3=1.5, H=507 mm, and $$r = \frac{(n1-n2)H}{n3} = 43.94 \ \mu m.$$

Figure 11:
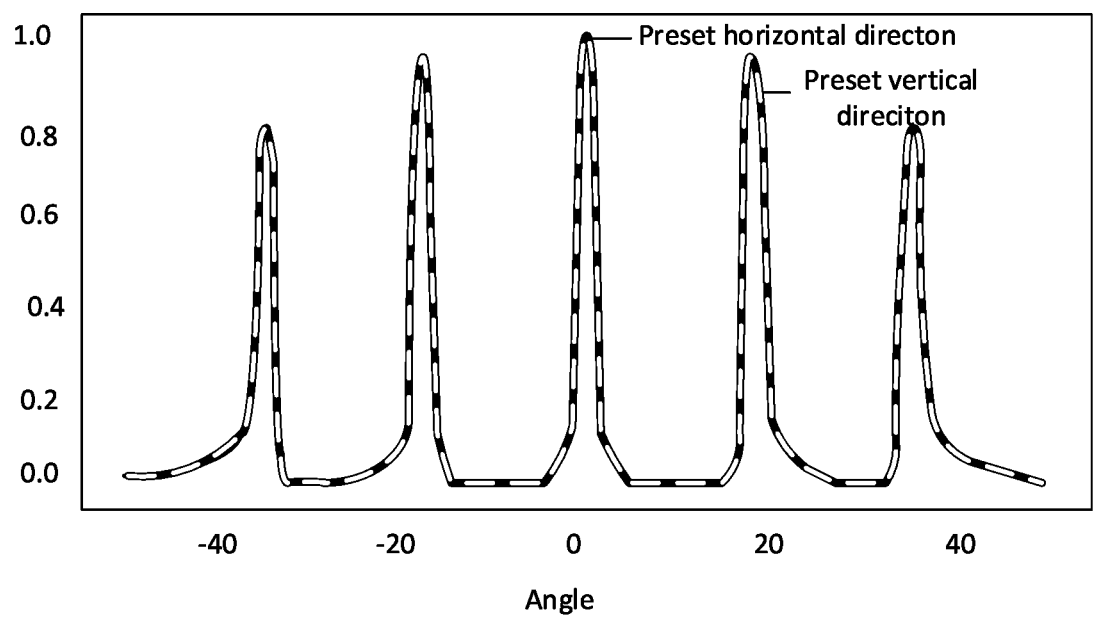
FIG. 11 is an angular spectrogram of light emission of sub-pixels of another display apparatus according to an embodiment of the present disclosure.
Figure 12:
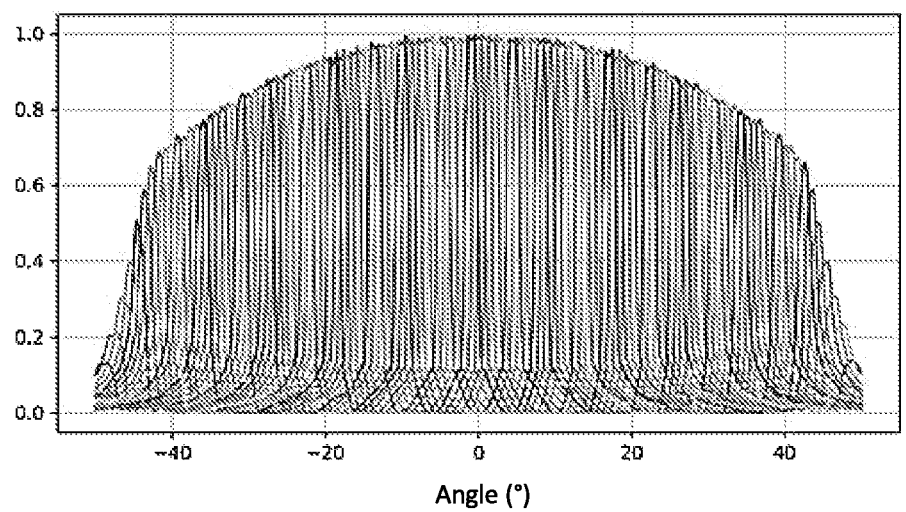
FIG. 12 is a distribution diagram of an angular spectrum of another sub-pixel in a horizontal direction according to an embodiment of the present disclosure.

Then, a simulation result of a radius of curvature of the cylindrical lens under the condition that the radius of curvature of the cylindrical lens is greater than or equal to 0.9r and smaller than or equal to 1.24r is introduced. According to the above computed parameters: P2=77.6 μm, H=537 mm, and r=43.94 μm, modeling is conducted, and then the radius of curvature is scanned, where the radius of curvature is 47 μm, such that a light-emitting angular spectrum of the sub-pixel numbered 10 under the condition of the radius of curvature of 47 μm as shown in FIG. 11 is obtained. It may be seen from FIG. 11 that angular spectra of the preset horizontal direction and the preset vertical direction are completely coincident, such that a technical effect of 3D compatibility in horizontal and vertical directions may be achieved. FIG. 12 shows distribution of angular spectra of 20 sub-pixels in a horizontal direction, from which crosstalk conditions between all viewpoints may be computed. Primary crosstalk (crosstalk between adjacent viewpoints) is 35.92%-78.09%, and secondary crosstalk (crosstalk between spaced viewpoints) is 8.11%-11.27%. It may be seen that crosstalk drops sharply after the secondary crosstalk. At the optimal viewing distance (L1=400 mm), crosstalk between left and right eyes is level 10 crosstalk, and crosstalk between the left and right eyes is 0, such that a desirable 3D display effect is achieved. Simulation is conducted according to distribution of crosstalk between left and right eyes corresponding to the above parameters in the whole visible space, and limitation and control are conducted according to a crosstalk standard within 10%, such that the 3D visible space is 300 mm-1400 mm in a vertical direction and −14.7°-14.7° in a horizontal direction. Limitation and control are conducted according to a crosstalk standard within 3%, such that the 3D visible space is 300 mm-700 mm in a vertical direction and −6°-6° in a horizontal direction. Limitation and control are conducted according to a crosstalk standard within 1%, such that the 3D visible space is 300 mm-500 mm in a vertical direction and −2.1°-2.1° in a horizontal direction. That is, when the first direction is parallel to the column direction, 3D display with low crosstalk may be achieved.

In some embodiments, sub-pixels include sub-pixel aperture zones, and zones of the sub-pixels 08 shown in FIGS. 1 and 8 are corresponding sub-pixel aperture zones. As shown in FIGS. 1 and 8, each sub-pixel aperture zone is in a shape of a rectangle; and two pairs of sides of the rectangle are parallel to the row direction x and the column direction y respectively.

Figure 13:
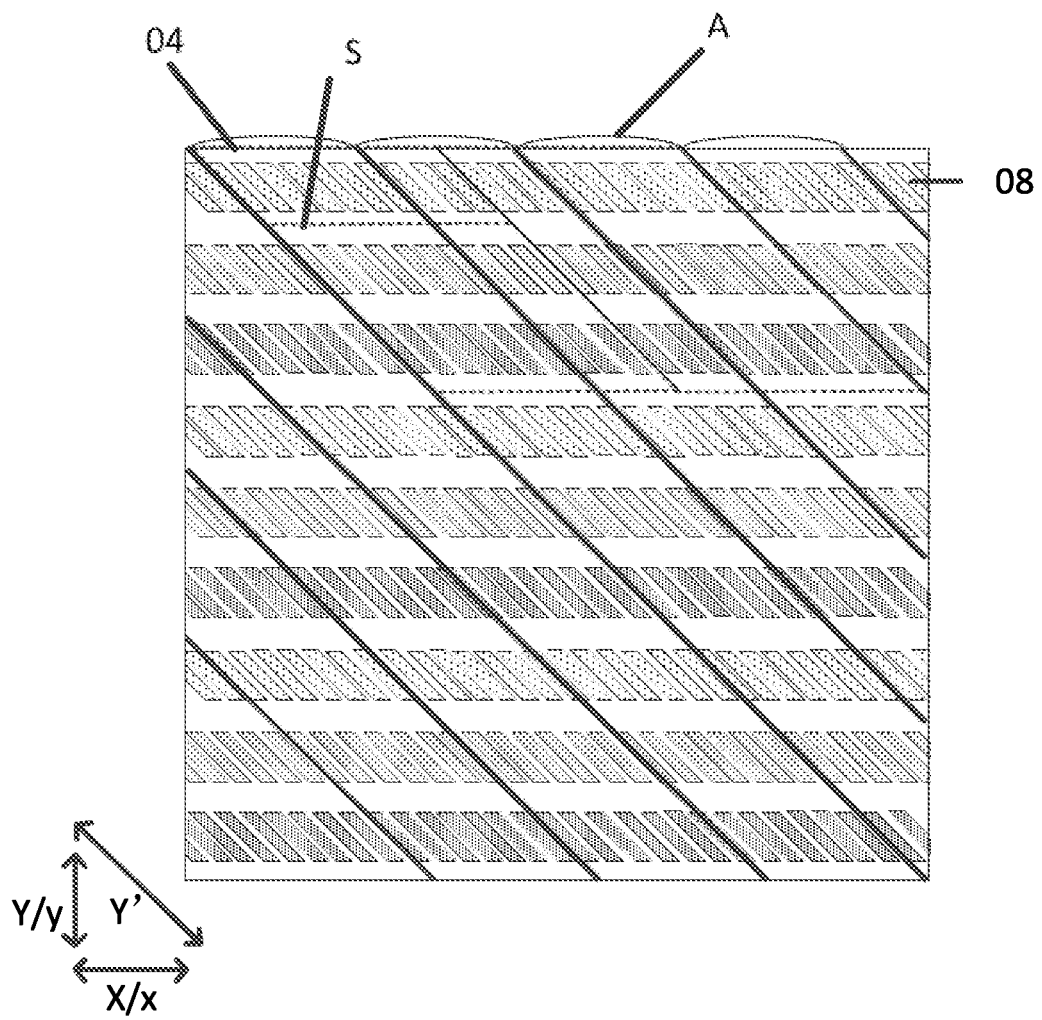
FIG. 13 is a schematic structural diagram of yet another display apparatus according to an embodiment of the present disclosure.

Alternatively, in some embodiments, as shown in FIG. 13, the zones of the sub-pixels 08 are the corresponding sub-pixel aperture zones, and each sub-pixel aperture zone is in a shape of a parallelogram; and one pair of sides of the parallelogram are parallel to the row direction x, and the other pair of sides of the parallelogram are parallel to the first direction Y'.

In FIGS. 13, K=2, M=3, and n=10. In FIG. 13, the row direction x is parallel to the preset horizontal direction X, the column direction y is parallel to the preset vertical direction Y, and the included angle between the first direction Y' and the preset vertical direction Y is 45°. An aperture ratio of sub-pixels is ⅔.

During specific implementation, the display panel includes: an array substrate and an opposite substrate that are opposite each other, and a liquid crystal layer between the array substrate and the opposite substrate.

In some embodiments, the opposite substrate includes a light-shielding layer, and the light-shielding layer includes sub-pixel aperture zones. That is, a pattern of the light-shielding layer may be designed to match shapes of the required sub-pixel aperture zones.

In some embodiments, the array substrate includes a plurality of scanning lines extending in the row direction x and a plurality of data lines extending in the column direction y.

During specific implementation, regardless of the shapes of the sub-pixel aperture zones, an extension direction of the scanning lines may be set to be parallel to the row direction x and an extension direction of the data lines may be set to be parallel to the column direction y. That is, the extension directions of the scanning lines and the data lines are independent of the shapes of the sub-pixel aperture zones.

During specific implementation, the array substrate includes driving units one-to-one corresponding to the sub-pixels, and the plurality of scanning lines and the plurality of data lines arranged in a crossed manner define zones of the driving units. When the row direction is perpendicular to the column direction, the zones of the driving units are roughly in shapes of rectangles. The shape of the zone of each driving unit may match a shape of the sub-pixel aperture zone. For example, the zone of the driving unit and the sub-pixel aperture zone are both in shapes of rectangles, and alternatively, the zone of the driving unit may be in the shape of a rectangle while the sub-pixel aperture zone is in the shape of a parallelogram.

In some embodiments, the display apparatus further includes:

an eye-tracking system configured to determine a position of eyes of a user in real time.

During specific implementation, in a 2D display mode, a first image driving signal corresponding to each pixel island may be determined according to an image to be displayed, the corresponding first image driving signals may be loaded to all sub-pixels in the pixel island, and further a 2D image is formed. In a 3D display mode, the eye-tracking system determines coordinates of the eyes of the user, image information to be displayed is determined, according to the image information to be displayed, second image driving signals corresponding to all viewpoints are determined and applied to the sub-pixels of each pixel island, and further a three dimensional image is formed. During specific implementation, a left-eye view and a right-eye view may be determined according to the coordinates of the eyes of the user, sub-pixels corresponding to the left-eye view and sub-pixels corresponding to the right-eye view in each pixel island group may be determined, driving signals corresponding to the left-eye view are supplied to the sub-pixels corresponding to the left-eye view, and driving signals corresponding to the right-eye view are supplied to the sub-pixels corresponding to the right-eye view; and alternatively, the second image driving signals corresponding to the same viewpoint may be applied to the sub-pixels at the same positions in different pixel islands, and further a 3D image having too many viewpoints is formed.

The display apparatus provided in some embodiments of the present disclosure is any product or component with a display function, such as a mobile phone, a tablet computer, a television, a display, a notebook computer, a digital photo frame, and a navigator. Other essential components of the display apparatus should be understood by those of ordinary skill in the art, which will not be repeated herein and should not limit the present disclosure.

In conclusion, according to the display apparatus according to the embodiment of the present disclosure, both the included angle between the extension direction of the light-splitting structures and the preset horizontal direction X and the included angle between the extension direction of the light-splitting structures and the preset vertical direction Y are greater than 0, that is, the light-splitting structures are obliquely placed relative to the preset horizontal direction X and the preset vertical direction Y, such that the human eyes may see the parallax image in both the preset horizontal direction and the preset vertical direction, and further the display apparatus may achieve bidirectional 3D display and improve user experience.

Although preferred embodiments of the present disclosure have been described, those skilled in the art can still make additional changes and modifications to the embodiments once they learn the basic inventive concept. Therefore, the appended claims are intended to be interpreted as including the preferred embodiments and all changes and modifications falling within the scope of the present disclosure.

Apparently, those skilled in the art can make various modifications and variations to the embodiments of the present disclosure without departing from the spirit and scope of the embodiments of the present disclosure. In this way, if the modifications and variations of the embodiments of the present disclosure fall within the scope of the claims of the present disclosure and their equivalent technologies, the present disclosure is also intended to include the modifications and variations.

What is claimed is:

1. A display apparatus, comprising:
a display panel comprising: a plurality of pixel islands arranged in arrays in a row direction and a column direction; each of the pixel islands comprises n sub-pixels arranged at intervals in the row direction, wherein n is an integer greater than 1; and the display panel comprises a preset horizontal direction and a preset vertical direction perpendicular to the preset horizontal direction; and
a light-splitting assembly at a display side of the display panel, wherein the light-splitting assembly comprises a plurality of light-splitting repeating units extending in a first direction and continuously arranged in the preset horizontal direction; each of the light-splitting repeating units comprises M light-splitting structures extending in the first direction; in the row direction, a width of the M light-splitting structures is equal to a width of K pixel islands, wherein M and K are positive integers; and both an included angle between the first direction and the preset horizontal direction and an included angle between the first direction and the preset vertical direction are greater than 0.

2. The display apparatus according to claim 1, wherein the row direction is parallel to the preset horizontal direction, and the column direction is parallel to the preset vertical direction;
or
both an included angle between the row direction and the preset horizontal direction and an included angle between the row direction and the preset vertical direction are greater than 0, and both an included angle between the column direction and the preset horizontal direction and an included angle between the column direction and the preset vertical direction are greater than 0; and the first direction is parallel to the column direction.

3. The display apparatus according to claim 2, wherein light rays emitted from light-emitting zones of all the sub-pixels in K pixel islands and split by M light-splitting structures form a continuous light-emitting zone in a space.

4. The display apparatus according to claim 3, wherein M=K=1, M>K=1, or K>M=1.

5. The display apparatus according to claim 3, wherein M is unequal to K, both M and K are integers greater than 1, M and K are co-prime, and K*n and M are co-prime.

6. The display apparatus according to claim 5, wherein the sub-pixels comprise sub-pixel aperture zones; and in the row direction, a ratio of a total width of n sub-pixel aperture zones to the width of the pixel island is greater than or equal to 0.9/M and smaller than or equal to 1.

7. The display apparatus according to claim 6, wherein in the row direction, the light-emitting zones of all the sub-pixels in the K pixel islands are complementarily spliced in a space.

8. The display apparatus according to claim 7, wherein in the row direction, a ratio of a width of the sub-pixel aperture zones to the width of the pixel island is 1/M.

9. The display apparatus according to claim 7, wherein in the row direction, the light-emitting zones of all the sub-pixels in the K pixel islands overlap each other in a space.

10. The display apparatus according to claim 9, wherein in the row direction, the light-emitting zones of all the sub-pixels in the K pixel islands evenly overlap each other in a space.

11. The display apparatus according to claim 10, wherein in the row direction, a ratio of a width of the sub-pixel aperture zones to the width of the pixel island is i/M, wherein i is an integer greater than 1 and smaller than or equal to M−1.

12. The display apparatus according to claim 5, wherein M=2, and K=3.

13. The display apparatus according to claim 1, wherein the included angle between the first direction and the preset horizontal direction and the included angle between the first direction and the preset vertical direction are both 45°.

14. The display apparatus according to claim 1, wherein the sub-pixels comprise the sub-pixel aperture zones, and each of the sub-pixel aperture zones is in a shape of a rectangle; and two pairs of sides of the rectangle are parallel to the row direction and the column direction respectively;
or
the sub-pixels comprise sub-pixel aperture zones, and each sub-pixel aperture zone is in a shape of a parallelogram; and one pair of sides of the parallelogram are parallel to the row direction, and the other pair of sides of the parallelogram are parallel to the first direction.

15. The display apparatus according to claim 14, further comprises:
an array substrate comprising a plurality of scanning lines extending in the row direction and a plurality of data lines extending in the column direction; and an opposite substrate arranged opposite the array substrate and comprising a light-shielding layer, wherein the light-shielding layer comprises a plurality of sub-pixel aperture zones.

16. The display apparatus according to claim 1, further comprising:
    a spacer dielectric layer between the light-splitting assembly and the display panel.

17. The display apparatus according to claim 16, wherein each of the light-splitting structures is a cylindrical lens.

18. The display apparatus according to claim 17, wherein the cylindrical lens comprises a first resin layer comprising a protrusion, and a planarized resin layer on one side facing away from the display panel, of the first resin layer; and the planarized resin layer comprises a smaller refractive index than the first resin layer;

or the cylindrical lens is a liquid crystal lens.

19. The display apparatus according to claim 18, wherein a radius of curvature of the cylindrical lens is greater than or equal to 0.9r and smaller than or equal to 1.24r, wherein $$r = \frac{(n1 - n2)}{n3} \times \frac{n3L1}{W} \times \frac{KP1 \cos \theta}{M},$$

n1 is a refractive index of the first resin layer or an extraordinary-light refractive index of the liquid crystal lens, n2 is a refractive index of the planarized resin layer or an ordinary-light refractive index of the liquid crystal lens, n3 is a refractive index of the spacer dielectric layer, L1 is an optimal viewing distance of the display apparatus, P1 is the width of the pixel island in the row direction, θ is an included angle between the first direction and the column direction, and W is a width of a projection of a main lobe viewing angle formed by light rays emitted from the sub-pixel at the optimal viewing distance.

20. The display apparatus according to claim 1, wherein every three pixel islands continuously arranged in the column direction form one pixel repeating unit; and
    in one pixel repeating unit, the sub-pixels of a same pixel island display a same color, and the sub-pixels of different pixel islands display different colors.

* * * * *